UNITED STATES PATENT OFFICE 2,398,078

ALUMINUM TREATING COMPOSITION

Bland B. Button, Jr., Chicago, and Joseph Janota, Jr., Crete, Ill., assignors to The Diversey Corporation, a corporation of Illinois No Drawing. Application February 9, 1945, Serial No. 577,151

2 Claims. (Cl. 252—146)

This invention relates to an aluminum treating composition of matter suitable for the removal of oxide film from aluminum and its alloys.

In order successfully to weld aluminum surfaces together it is essential that a uniform surface be produced which has a low electric resistance and is substantially free from aluminum oxide. The mere removal of aluminum oxide does not produce a suitable surface. For example, hydrofluoric acid will successfully remove aluminum oxide, but unless very carefully controlled, will overtreat and produce a surface of poor electric conductivity. In addition to removing the oxide coating, the treating composition must not corrode the underlying metal, or leave what is known as a "smut" film. The composition must also not be critical as to concentration or time of treatment.

The present product comprises approximately 79% niter cake (sodium acid sulfate), 1% sodium fluosilicate, and 20% anhydrous sodium chromate. The mixture is employed at about the rate of about 1 lb. per gallon of water at room temperature. When so employed it removes oxide film within a few seconds, does not corrode the metal, does not leave a smut film, does not overtreat, and produces a surface of low electric resistance which remains in this state for a period of many hours.

The composition also has the property of being readily analyzed or tested. One of the difficulties of fluorine-containing compositions heretofore has been that no rapid and convenient test for fluorine ion in the solutions has existed. In the present case it has been found that an ordinary acid titration may be employed as a control, ignoring the fluosilicate ion. The reason for this is that the sodium fluosilicate is only slightly soluble in the composition so that an excess of undissolved fluosilicate is always present. If the fluosilicate is used up, more of the material will go into solution.

The sodium chromate apparently is responsible for the elimination of a smut film. This film is presumably caused by undissolved copper, and the chromate apparently serves to dissolve any copper present in the aluminum. The sodium chromate is preferably employed in anhydrous form because this material has only a small tendency to take up water. It, therefore, serves to keep the material free flowing as well as to avoid any possible tendency to liberate hydrofluoric acid during storage.

The ratio of 4 parts of niter cake to 1 part of chromic acid may be slightly varied. The proportion of chromic acid is, however, approximately a minimum where the bath is to be long maintained. The proportion may, however, be somewhat increased.

The proportion of sodium fluosilicate is not critical owing to the fact already noted that only a small proportion of it dissolves. The material is employed in excess even at the per cent specified and, therefore, any further increase merely serves to displace some more useful ingredient.

The foregoing detailed description has been given for clearness of understanding only, and no unnecessary limitations should be understood therefrom.

What we claim as new, and desire to secure by Letters Patent, is:

1. A composition of matter consisting essentially of approximately 4 parts by weight of niter cake, 1 part of substantially anhydrous sodium chromate, and 0.05 part of sodium fluosilicate.

2. A composition of matter consisting essentially of a dry mix of approximately 79% niter cake, 1% sodium fluosilicate, and 20% anhydrous sodium chromate.

BLAND B. BUTTON, Jr.
JOSEPH JANOTA, Jr.